(12) United States Patent
Muramatsu et al.

(10) Patent No.: US 6,240,147 B1
(45) Date of Patent: May 29, 2001

(54) AUTO FREQUENCY CONTROL APPARATUS

(75) Inventors: Yoshihito Muramatsu, Shizuoka; Tadashi Oga, Kanagawa, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/097,290

(22) Filed: Jun. 12, 1998

(30) Foreign Application Priority Data

Jun. 20, 1997 (JP) .................................................... 9-180419

(51) Int. Cl.$^7$ .................................................... H04L 27/06
(52) U.S. Cl. ............................................ 375/344; 375/340
(58) Field of Search .................................... 375/344, 133, 375/340; 455/192.2, 182.2

(56) References Cited

U.S. PATENT DOCUMENTS

| | | | |
|---|---|---|---|
| 5,483,686 | * 1/1996 | Saka et al. | 455/182.2 |
| 5,493,710 | * 2/1996 | Takahara et al. | 455/192.2 |
| 5,500,878 | * 3/1996 | Iwasaki | 375/344 |
| 5,579,346 | * 11/1996 | Kanzaki | 375/344 |
| 5,706,315 | * 1/1998 | Ogoro | 375/344 |

* cited by examiner

*Primary Examiner*—Stephen Chin
*Assistant Examiner*—Tony Al-Beshrawi
(74) *Attorney, Agent, or Firm*—Pearne & Gordon LLP

(57) ABSTRACT

An auto frequency control apparatus arranged to vary the division ratio of the comparison signal portion in the phase comparator with the AFC control voltage so as to change the frequency in order to make coincide the frequency of the output signal from a local oscillation portion and that of a carrier-wave signal for a frequency-shift keying signal with each other. The frequency of an output signal from a reference-signal generating portion is divided by a divider 213. The frequency of the output signal from a local oscillation portion is supplied to an auto frequency control 202. A control-signal processing portion 207 receives AFC control voltage to instruct an updown counter 205 to correct the division to correspond to the voltage. In accordance with the instruction, a counter 203 divides the supplied signal, the signal being multiplied with an integer in a multiplier 204 so as to be transmitted. The output signal is divided with a division ratio set by a divider 209. A phase comparator 214 detects the phase difference between the two output signals from the dividers 209 and 213 so as to transmit the phase difference to a voltage control oscillator provided for the local oscillation portion through a charge pump 215. Thus, the frequency of the local oscillation portion is varied.

16 Claims, 8 Drawing Sheets

US 6,240,147 B1

AUTO FREQUENCY CONTROL APPARATUS

BACKGROUND OF THE INVENTION

The present invention relates to a frequency-shift keying signal type auto frequency control apparatus for use in digital wireless communication. More particularly, the invention relates to a structure for varying the frequency by changing the division ratio of the comparison signal with an AFC control voltage so as to make coincide the frequency of an output signal from a local oscillation portion and that of a carrier-wave signal for the frequency-shift keying signal with each other.

In recent years, there is a trend in digital wireless communication toward reduction in the size of a radio wave receiver terminal equipment adapted to a frequency-shift keying method in order to improve the portability.

The radio-wave receiver is adapted to a receiving method including a heterodyne method with which the frequency of a carrier-wave signal is mainly mixed with the frequency of a local oscillation portion so as to perform demodulation from the extracted intermediate frequency. Another method is a direct conversion method wherein the frequency of the carrier-wave signal and that of the local oscillation portion coincide with each other so that the modulation signal is directly extracted.

However, the heterodyne method encounters deterioration in the sensitivity characteristic if the difference between the frequency of the carrier-wave signal and that of the local oscillation portion is deviated from a predetermined intermediate frequency. Also the direct conversion method encounters deterioration if the frequency of the carrier-wave signal is deviated from that of the local oscillation portion.

Hitherto, a direct-conversion receiver has been disclosed in Unexamined Japanese Patent Publication 7-154435 in which an automatic frequency control (AFC) loop is formed by using a frequency detector. The structure of the frequency receiver will now be described with reference to FIGS. 7, 8 and 9.

FIG. 7 shows a conventional AFC loop in the direct conversion type receiver. Received wave Fsig subjected to frequency-shift keying modulation with the digital signal is amplified by an amplifier 701. The output from the amplifier 701 is divided, and then supplied to mixers 702 and 703. A signal transmitted from a local oscillator 706 is divided. The phase of one of the divided portions is delayed by a phase shifter 705 by an angular degree of 90°, and then supplied to the mixer 702. Another portion of the divided portions is supplied to the mixer 703.

An in-phase base band signal (an I signal) obtained from the output of the mixer 703 and a quadrature base band signal (a Q signal) obtained from the output of the mixer 702 and time-functionally quadrature with respect to the output of the mixer 703 are detected by a demodulating portion 707. Thus, a demodulation signal is obtained.

The demodulating portion of the direct conversion type receiver performs the detection operation required in the AFC will now be described. The I signal and the Q signal has the relationship that the phase shifts are the same when the frequency of the voltage control oscillator coincides with that of the received wave. When the frequencies are shifted from each other, the phase shifts are made to be different from each other. The change in the phase shift is detected by a frequency detector 710. A signal which is logical in a direction in which the shifted frequency is restored is transmitted to a next control means 711. The output of the control means 711 is allowed to pass through a low pass filter 708 so as to vary the frequency of the local oscillation portion 706 with the control voltage from which noise has been removed. Thus, the AFC loop is constituted.

The control voltage which is the output of the control means 711 shown in FIG. 7 is directly applied to the oscillator 706 in the local oscillation portion 704. Another AFC loop arranged to perform a similar operation is shown in FIG. 8. The structure shown in FIG. 8 is arranged in such a manner that the operations of a mixer 802 and a demodulating portion 806 disposed in a passage with which the received wave is demodulated are adapted to the above-mentioned direct conversion receiving method. The heterodyne receiving method may be employed in which the frequency of the carrier-wave signal is converted into the intermediate frequency with the frequency of the output signal from a local oscillation portion 803 after which a demodulating portion 806 demodulates the signal.

The heterodyne method is arranged in such a manner that the amount of deviation between the difference between the frequency of the carrier-wave signal and the frequency of the output signal from the local oscillation portion and a predetermined reference intermediate frequency is detected by a frequency detector 808. To cancel the amount of the difference, the AFC loop is constituted such that an output of control voltage is produced by a control means 809 so as to vary the frequency of the local oscillation portion 803.

The structure shown in FIG. 8 is the same as that shown in FIG. 7 in the structure of the receiver and the circuit structures of the frequency detector and the control means. However, the structure is different from that shown in FIG. 8 in that a phase synchronizing means 811 is provided which makes coincide the phase of a division signal of a reference-signal generating portion 810 and that of the division signal of the voltage control oscillator 804 with each other.

FIG. 9 shows an example of the structure of a circuit for use in the phase synchronizing means 811. Data of the division ratio transmitted from a division-data setting means 812 is received by a data control portion 905. Then, data of the division ratio for each system which must be divided is transmitted to a shift register 906. The shift register 906 temporarily stores data of the division ratio so as to produce an output to storage means 904 and 907 of the corresponding systems in accordance with the length of data.

The storage means 904 is provided for the purpose of temporarily storing data of the division ratio which must be supplied to the signal system which must be subjected to a comparison. The signal which must be subjected to a comparison is the output signal from the local oscillation portion 803. The storage means 907 is provided for the purpose of temporarily storing data of the division ratio which must be supplied to the reference signal system. The reference signal is the output signal from the reference-signal generating portion 810.

The amplitude of the reference signal is limited by a limit amplifier 908, and then supplied to a program counter 909. The frequency of the supplied signal is divided with the division ratio determined by reading data of the division ratio stored on the storage means 907, and the divided frequency is transmitted to a phase comparator 910.

On the other hand, the amplitude of the signal which must be subjected to a comparison is limited by a limit amplifier 901, and then supplied to a pre-scaler 902 so as to be divided. An output signal from the pre-scaler 902 is supplied to a program counter 903. The frequency of the supplied signal is divided with the division ratio determined by reading data of the division ratio stored on the storage means 904, and then the divided frequency is transmitted to the phase comparator 910.

The phase comparator 910 subjects, to a comparison, the phase difference between the reference signal which is the output of the program counter 909 and the signal which is the output of the program counter 903 and which must be subjected to the comparison. Then, the phase comparator 910 transmits, to a charge pump 911, a difference signal for making coincide the phases with each other. The charge pump 911 produces an output of the control voltage corresponding to the difference signal, the control voltage being transmitted as information for controlling the frequency of the local oscillation portion 803.

Since the phase synchronizing means 811 is provided as described above, a characteristic is realized in that the frequency can easily be varied when the set division ratio is changed. Thus, the foregoing structure is known as an effective means when a plurality of channels are received. Specifically, the instruction to set the division ratio is transmitted by the setting means 813 to the division-data setting means 812. The division-data setting means 812 writes data of the division ratio on the phase synchronizing means 811.

The above-mentioned means has a characteristic that when the frequency of the reference-signal generating portion has been changed, the frequency of the voltage control oscillator is changed by a quantity corresponding to the changed deviation. To use the above-mentioned characteristic to form the AFC loop, the structure in the reference-signal generating portion 810 is arranged such that, for example, a voltage control type crystal oscillator (VCXO) is provided. Moreover, AFC control voltage which is the output of the control means 809 is transmitted to the VCXO so that the oscillation frequency is varied. The changed deviation is allowed to act on the voltage control oscillator, as a result of which the frequency of the local oscillation portion is varied. Thus, the AFC loop can be constituted.

In recent years, there arises a necessity for the digital wireless communication system to demodulate frequency-shift keying signal having a low modulation index in order to make effective use of frequency resources. Therefore, the wireless receiver adapted to the heterodyne method must be structured such that the difference between the center of the spectrum of the received signal and the frequency of the local oscillation portion must coincide with a predetermined intermediate frequency as accurate as possible. In a case of the direct conversion method, the difference must be made to be zero.

In the conventional wireless receiver having the AFC loop shown in FIG. 8, the control means 809 produces an output of control voltage which is in proportion to the frequency detected by the frequency detector 808 so as to transmit the output to the reference-signal generating portion 810. However, in general, the voltage-capacity characteristic of a device constituting the oscillation circuit in the reference-signal generating portion and arranged to convert the voltage into a capacity is not a linear characteristic. Therefore, the influence of the characteristic of the device is directly exerted on the variable range of the control voltage. Thus, there arises a problem in that the variable width of the frequency per unit voltage is undesirably changed and correct coincidence cannot be achieved.

Therefore, the change in the voltage-capacity characteristic occurring because of the dispersion of the device and the temperature characteristic sometimes changes the variable width of the frequency per unit voltage.

Since the reference-signal generating portion 810 shown in FIG. 8 generates the reference signal for use in the phase synchronizing means 811, a crystal oscillator is usually employed because high Q can be obtained and stability at high frequencies can be realized. In an example case of the voltage control type crystal oscillator (VCXO), influence of external noise on the control voltage sometimes arises a possibility that the S/N ratio of the oscillation spectrum easily deteriorates and the stability of the frequency is lost.

When the direct conversion type receiver or the heterodyne receiver is formed into a portable unit, the structure must be simplified for reducing the size by, for example, integrating circuits.

SUMMARY OF THE INVENTION

To overcome the above-mentioned problems, an object of the present invention is to provide an auto frequency control apparatus arranged to control the frequency of the output signal from a local oscillation portion thereof so as to make substantially coincide the frequency with a required frequency of the received signal which has been subjected to a frequency-shift keying process.

To achieve the above-mentioned object, the present invention is structured such that a frequency detector transmits, to a control means, a logical signal for correcting the difference between the frequency of the carrier-wave signal for a received signal and that of the output signal from a local oscillation portion to a predetermined difference in the frequency. The control means transmits AFC control voltage corresponding to the logical signal to an auto frequency control means included in a phase synchronizing means so as to vary the frequency of the output signal from the local oscillation portion so that auto frequency control is performed.

According to first aspect of the present, there is provided a structure comprising: an amplifier for amplifying a frequency-shift keying signal; a local oscillation portion for transmitting a signal for converting the frequency-shift keying signal into a low-frequency signal; a mixer for mixing an output signal from the amplifier and an output signal from the local oscillation portion with each other; a demodulating portion for extracting a low-frequency signal from the output signal, the frequency of which has been converted by the mixer, so as to detect and demodulate the modulated signal; phase synchronizing means which makes coincide a frequency obtained by dividing the output signal from the local oscillation portion and a frequency obtained by dividing a reference signal with each other by detecting the phase difference between the two signals and which transmits a control voltage corresponding a result of the detection to the local oscillation portion so as to synchronize the phases; a reference-signal generating portion for generating the reference signal which is supplied to the phase synchronizing means; frequency-difference detection means for communicating, to the phase synchronizing means, a voltage corresponding to a result of the detection of the frequency difference between a carrier-wave signal for the frequency-shift keying signal and the output signal from the local oscillation portion in accordance with a result of the detection performed by the demodulating portion; and division-data setting means for setting a division ratio for dividing the frequency of a signal which is supplied to the phase synchronizing means. Thus, an operation can be realized with which the frequency of the output signal from the local oscillation portion is controlled so as to make substantially coincide the frequency with a required frequency of the received signal subjected to the frequency-shift keying process.

According to second aspect of the present invention, there is provided an auto frequency control apparatus wherein that the frequency-difference detection means incorporates a frequency detector for detecting a component of the frequency difference between the carrier-wave signal for the frequency-shift keying signal and the output signal from the local oscillation portion in accordance with a result of the detection performed by the demodulating portion and control means for producing an output of a logical voltage in accordance with the amount of deviation of the frequency difference obtained from the frequency detector from a predetermined referential frequency difference. As a result, logical output voltage can be transmitted to the phase synchronizing means.

According to third aspect of the present, there is provided an auto frequency control apparatus wherein the control means produces an output of a logical voltage signal corresponding to the output signal from the frequency detector. As a result, a logical voltage signal on the basis of the output signal from the frequency detector can be supplied to the phase synchronizing means.

According to fourth aspect of the present, there is provided an auto frequency control apparatus wherein the division-data setting means sets division ratios for dividing the frequencies of the output signal from the local oscillation portion which is supplied to the phase synchronizing means and the output signal from the reference-signal generating portion. As a result, each division ratio can be set from the division-data setting means.

According to fifth aspect of the present invention, there is provided an auto frequency control apparatus wherein the phase synchronizing means incorporates auto frequency control means which controls the division ratio of the output signal from the local oscillation portion in accordance with the logical output voltage generated by the frequency-difference detection means so as to automatically vary the frequency, a first divider for lowering the frequency of the output signal from the auto frequency control means at a set division ratio, a second divider for lowering the frequency of the output signal from the reference-signal generating portion at a set division ratio, a phase comparator for detecting the phase difference between the output signal from the first divider and the output signal from the second divider and a charge pump which receives pulse waves for time corresponding to the phase difference transmitted from the phase comparator into a DC voltage for controlling the frequency of the local oscillation portion. Since the phase synchronizing means having the above-mentioned structure controls the frequency of the local oscillation portion, the frequency can be made to substantially coincide with a required frequency of the received signal subjected to the frequency-shift keying process.

According to sixth aspect of the present invention, there is provided an auto frequency control apparatus wherein the first and second dividers have storage means for temporarily storing division data transmitted from the division-data setting means and a program counter for performing a dividing operation in accordance with stored division data. As a result, the dividing operation can be performed with a predetermined division ratio.

According to seventh aspect of the present, there is provided an auto frequency control apparatus wherein the auto frequency control means incorporates a counter for dividing the frequency of the output signal from the local oscillation portion with a division ratio instructed with counter preset input, a multiplier for multiplying the frequency of the output signal from the counter with an integer, an updown counter for transmitting a preset value which serves as data for setting the division ratio to the counter, a register for giving an initial value to the updown counter, a correction instruction portion for increasing/decreasing the set value for the updown counter with an integer value and a control-signal processing portion for issuing an increasing/decreasing instruction to the correction instruction portion and transmitting a reset signal to the counter. Thus, the frequency of the output signal from the local oscillation portion can be varied.

According to eighth aspect of the present, there is provided an auto frequency control apparatus wherein the control-signal processing portion has functions of detecting the output voltage of the frequency-difference detection means at the first transition of a timing clock, issuing, to the correction instruction portion, an instruction to increase/decrease the integer value in accordance with the logic at the detection and resetting the count by communicating a fact that the correction has been performed to the counter. Thus, the variation of the division ratio of the counter in the auto frequency control means can be instructed.

According to ninth aspect of the present, there is provided an auto frequency control apparatus wherein a reset generating portion is provided as a subsidiary unit for the phase synchronizing means and an instruction is issued to the auto frequency control means to initialize the control operation. As a result, the initialization of the control operation can be instructed to the auto frequency control means.

According to tenth aspect of the present, there is provided an auto frequency control apparatus wherein the reset generating portion transmits logical signals for resetting the set division ratio value and the counter to default values. Thus, the set division ratio for the auto frequency control means and the counter can be reset to the default values with the transmitted logical signal.

According to eleventh aspect of the present, there is provided an auto frequency control apparatus wherein the local oscillation portion incorporates at least a voltage control oscillator, the oscillation frequency of which is changed to correspond to external control voltage and a low pass filter arranged to cut a noise component of the control voltage which is the output of the phase synchronizing means and act on a transient response characteristic in a phase synchronizing process. Thus, a signal for detecting the received wave as a low-frequency signal can be transmitted.

According to twelfth aspect of the present, there is provided an auto frequency control apparatus, wherein the frequency-difference detection means is structured to always generate an output voltage signal for maintaining a state in which the difference between a central frequency of the spectrum of a received signal and the frequency of the output signal from the local oscillation portion coincides with a predetermined intermediate frequency when a heterodyne receiving method is employed. As a result, an auto frequency control loop can be constituted when the heterodyne receiving method is employed.

According to thirteenth aspect of the present invention, there is provided an auto frequency control apparatus, wherein the frequency-difference detection means is structured to always generate an output voltage signal for maintaining a state in which a central frequency of the spectrum of a received signal and the frequency of the output signal from the local oscillation portion coincide with each other when a direct conversion receiving method is employed. As a result, an auto frequency control loop can be constituted when the direct conversion receiving method is employed.

According to fourteenth aspect of the present invention, there is provided a radio-wave receiver comprising an auto frequency control apparatus which is adapted to the heterodyne receiving method. As a result, a digital radio wave signal of the frequency-shift keying signal can be received.

According to fifteenth aspect of the present invention, there is provided a radio-wave receiver comprising an auto frequency control apparatus which is adapted to the direct conversion receiving method. As a result, a digital radio wave signal of the frequency-shift keying signal can be received.

DETAILED DESCRIPTION OF THE PREFERRED EMBODIMENTS

An embodiment of the present invention will now be described with reference to FIGS. 1 to 6.

Figure 1:
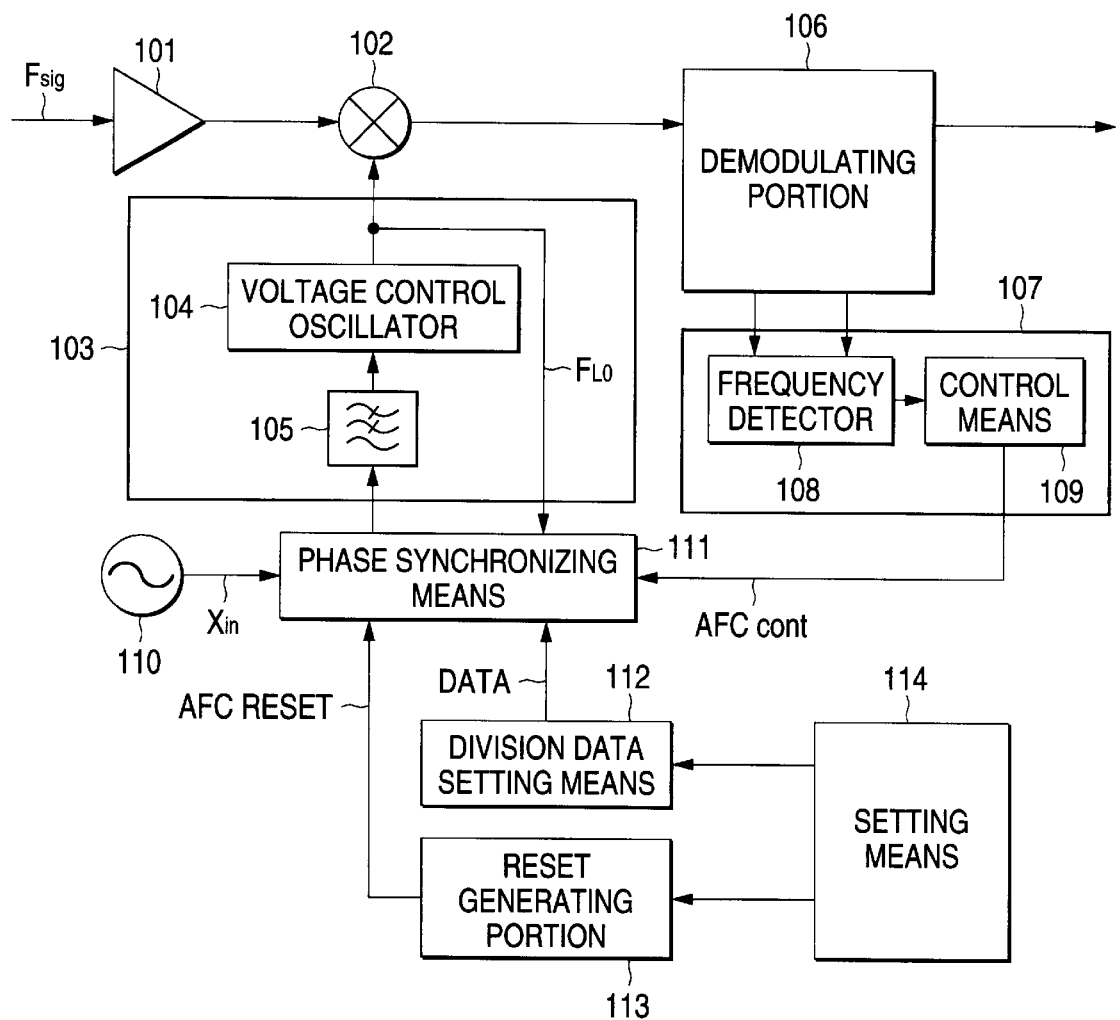
FIG. 1 is a circuit diagram showing a radio-wave receiver incorporating an auto frequency control apparatus according to an embodiment of the present invention.
Figure 2:
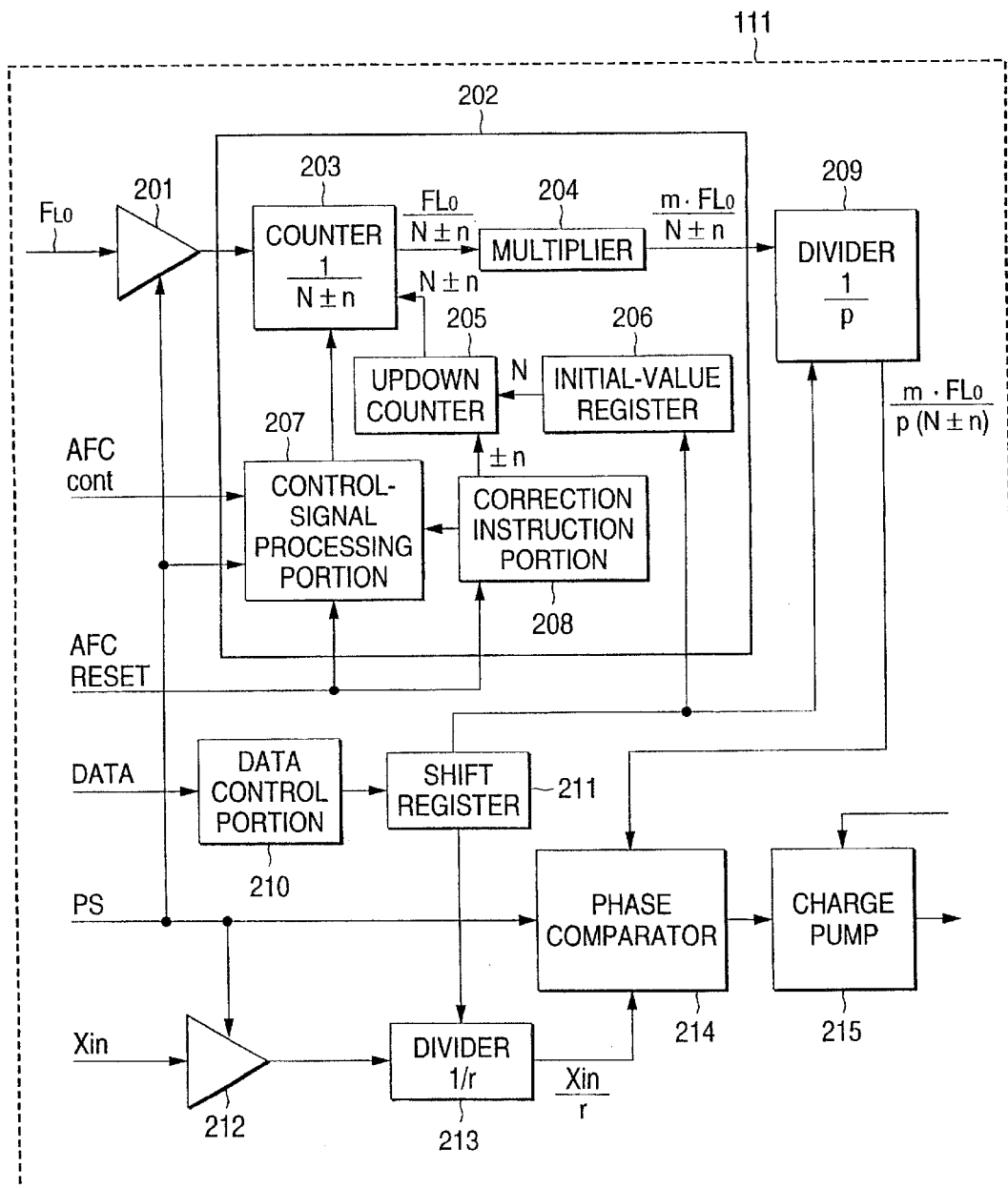
FIG. 2 is a circuit diagram showing a phase synchronizing means incorporating an auto frequency control means which is an essential portion of the present invention.
Figure 3:
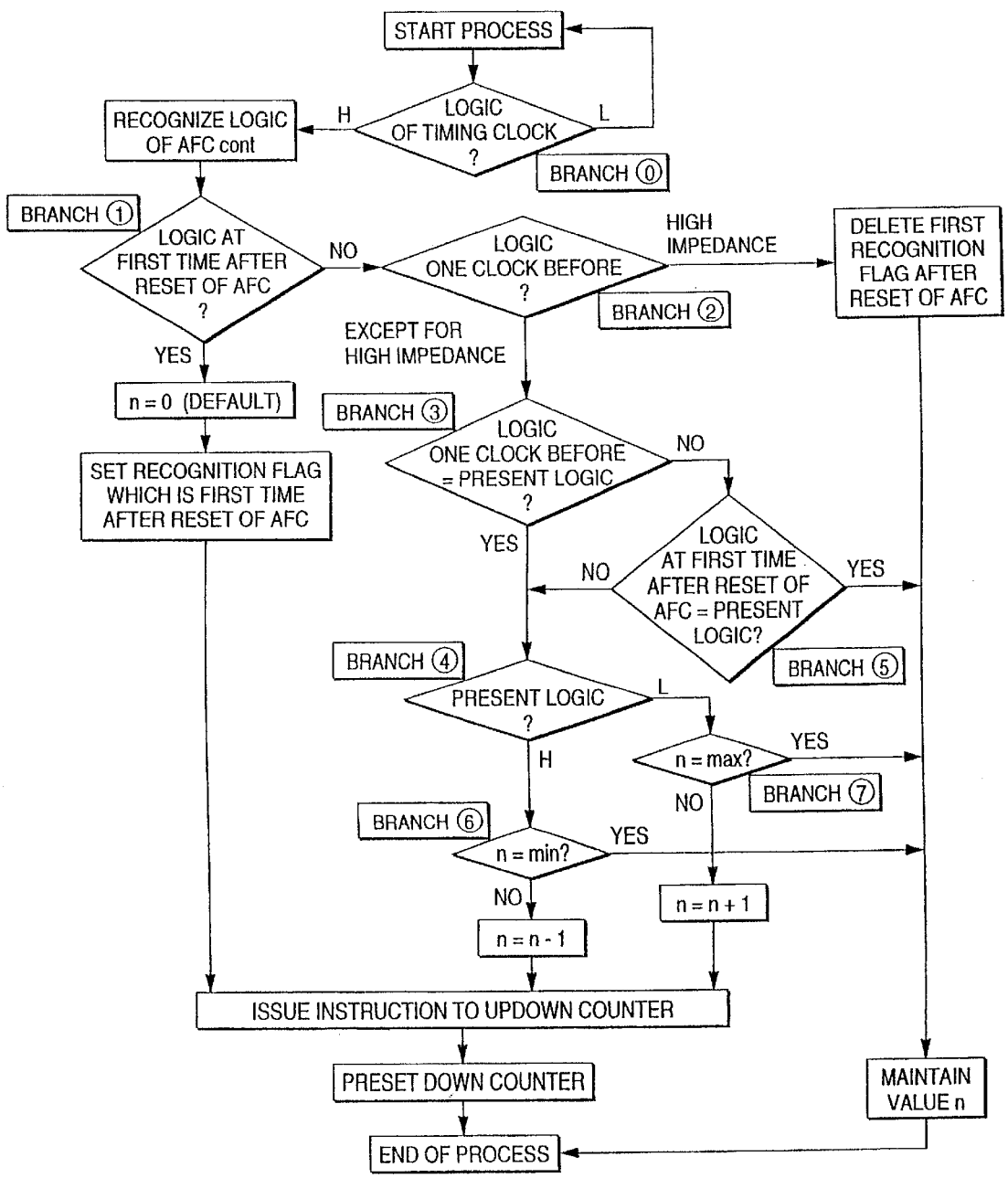
FIG. 3 is a flow chart of the operation which is performed by a control-signal processing portion included in the auto frequency control means which is the essential portion of the present invention.

FIG. 1 is a circuit diagram in a wireless receiver incorporating an auto frequency control apparatus according to the embodiment of the present invention. FIG. 2 is a circuit diagram in a phase synchronizing means having the auto frequency control means which is an essential portion of the present invention. FIG. 3 is a flow chart of the operation of a control-signal processing portion in the auto frequency control means which is an essential portion of the present invention.

Figure 4:
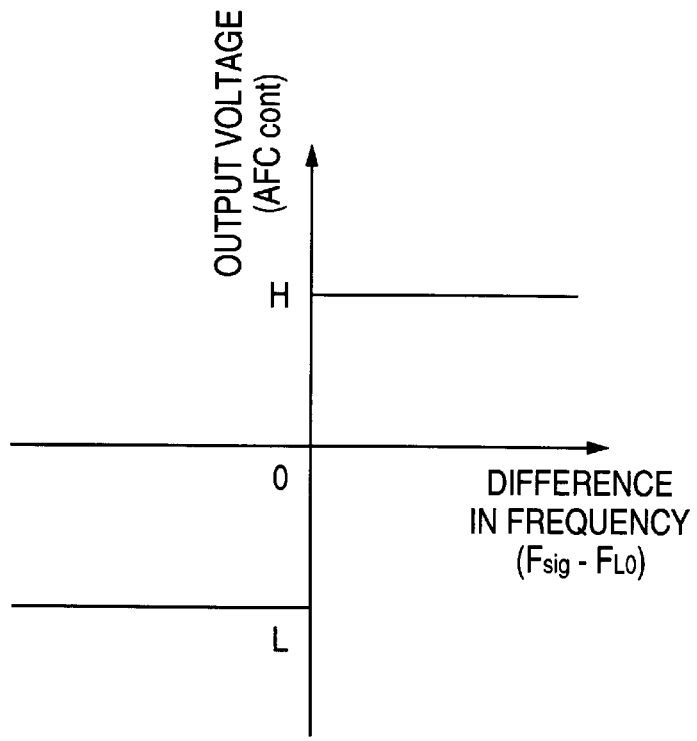
FIG. 4 is a graph showing the characteristic of frequency difference-output voltage in the frequency-difference detection means according to the embodiment of the present invention in a case of a direct conversion receiving method.
Figure 5:
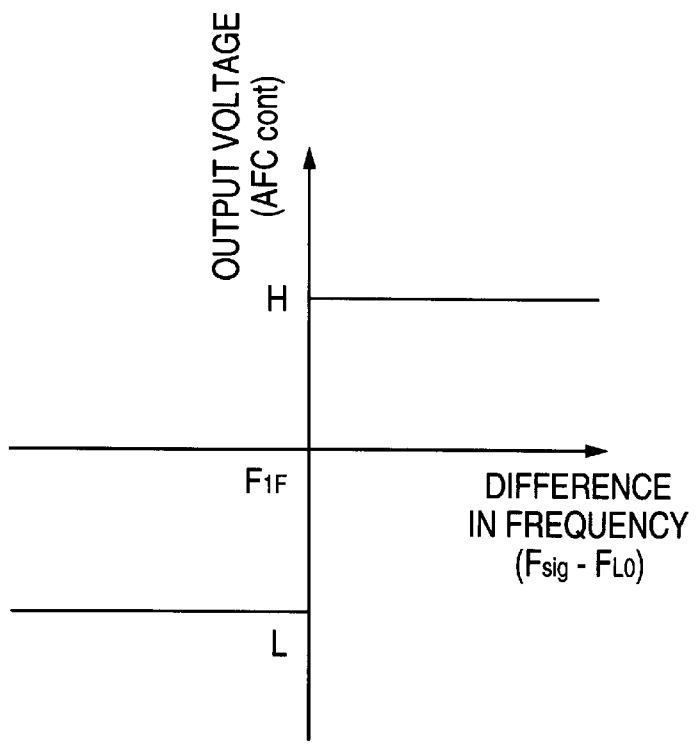
FIG. 5 is a graph showing the characteristic of frequency difference-output voltage in the frequency-difference detection means according to the embodiment of the present invention in a case of a heterodyne receiving method.
Figure 6:
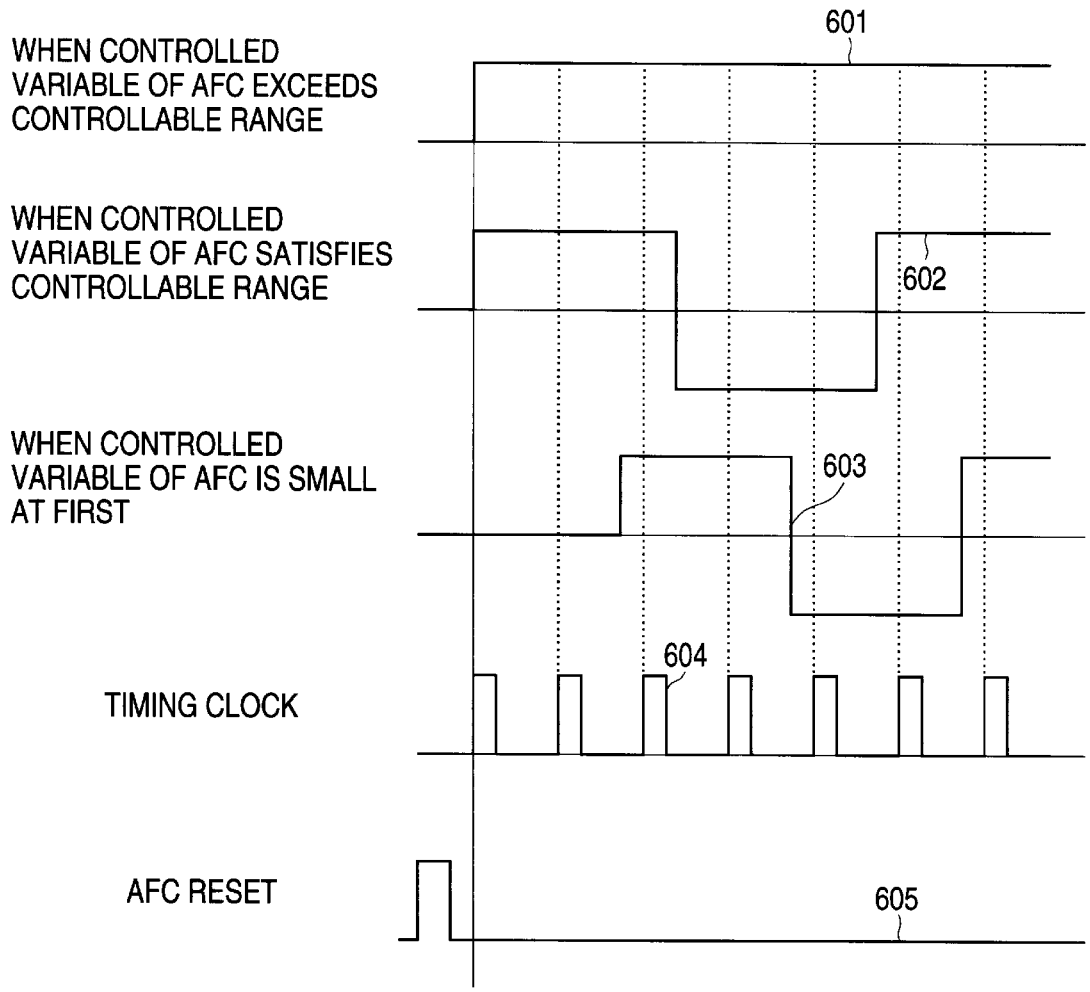
FIG. 6 is a timing chart showing the relationship between the received frequency and the local oscillation frequency realized in the embodiment of the present invention so as to describe the AFC control process.
Figure 7:
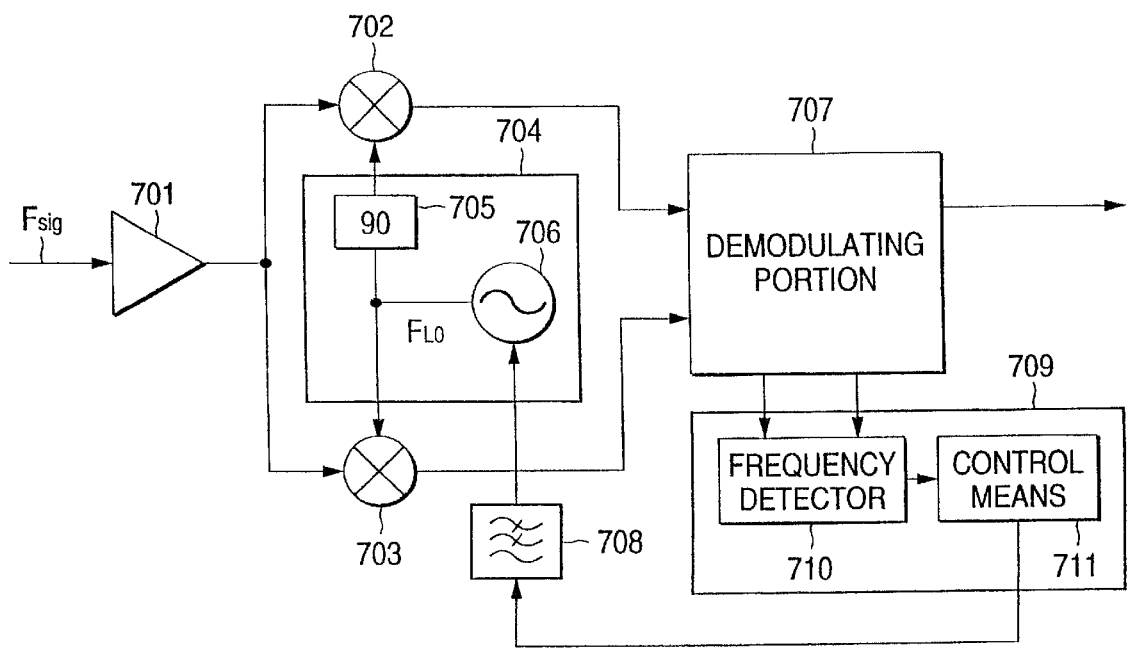
FIG. 7 is a diagram showing an example of a circuit for use in a direct conversion receiver constituting a conventional auto frequency control loop.
Figure 8:
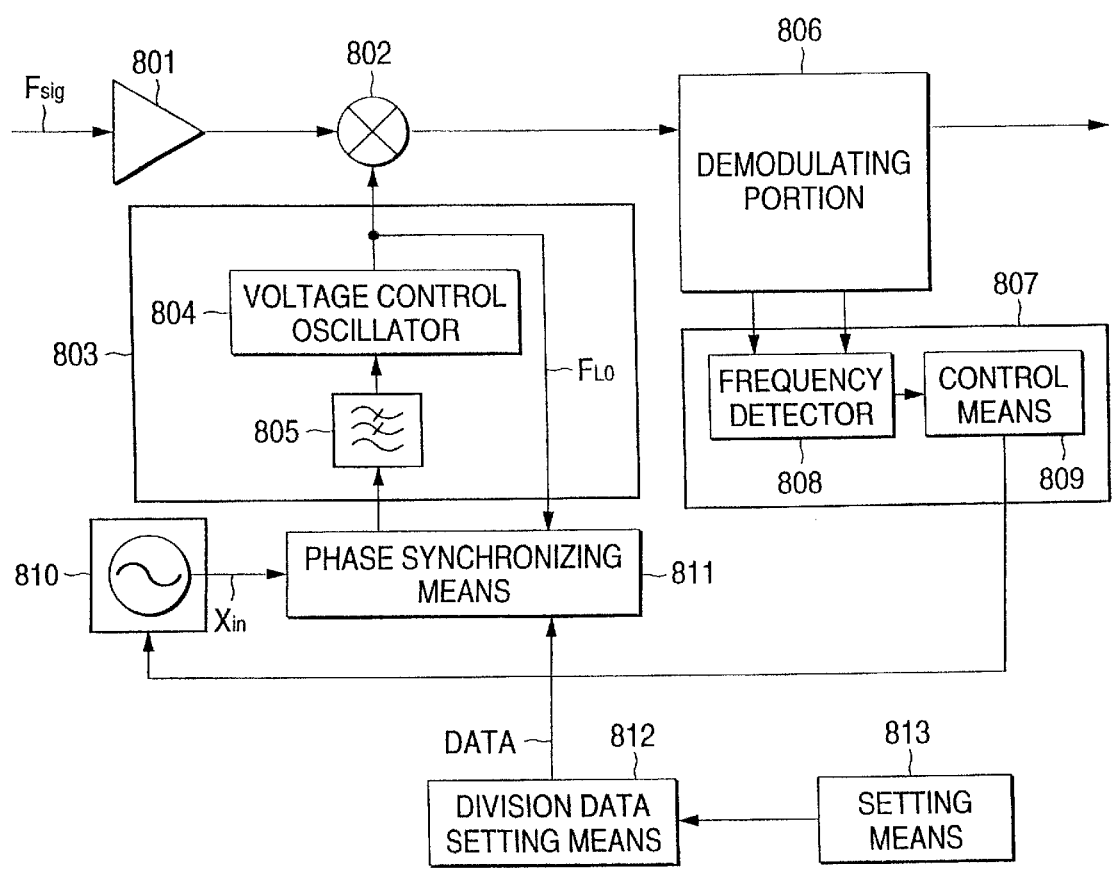
FIG. 8 is a diagram showing an example of a circuit for use in a heterodyne receiver constituting the conventional auto frequency control loop.
Figure 9:
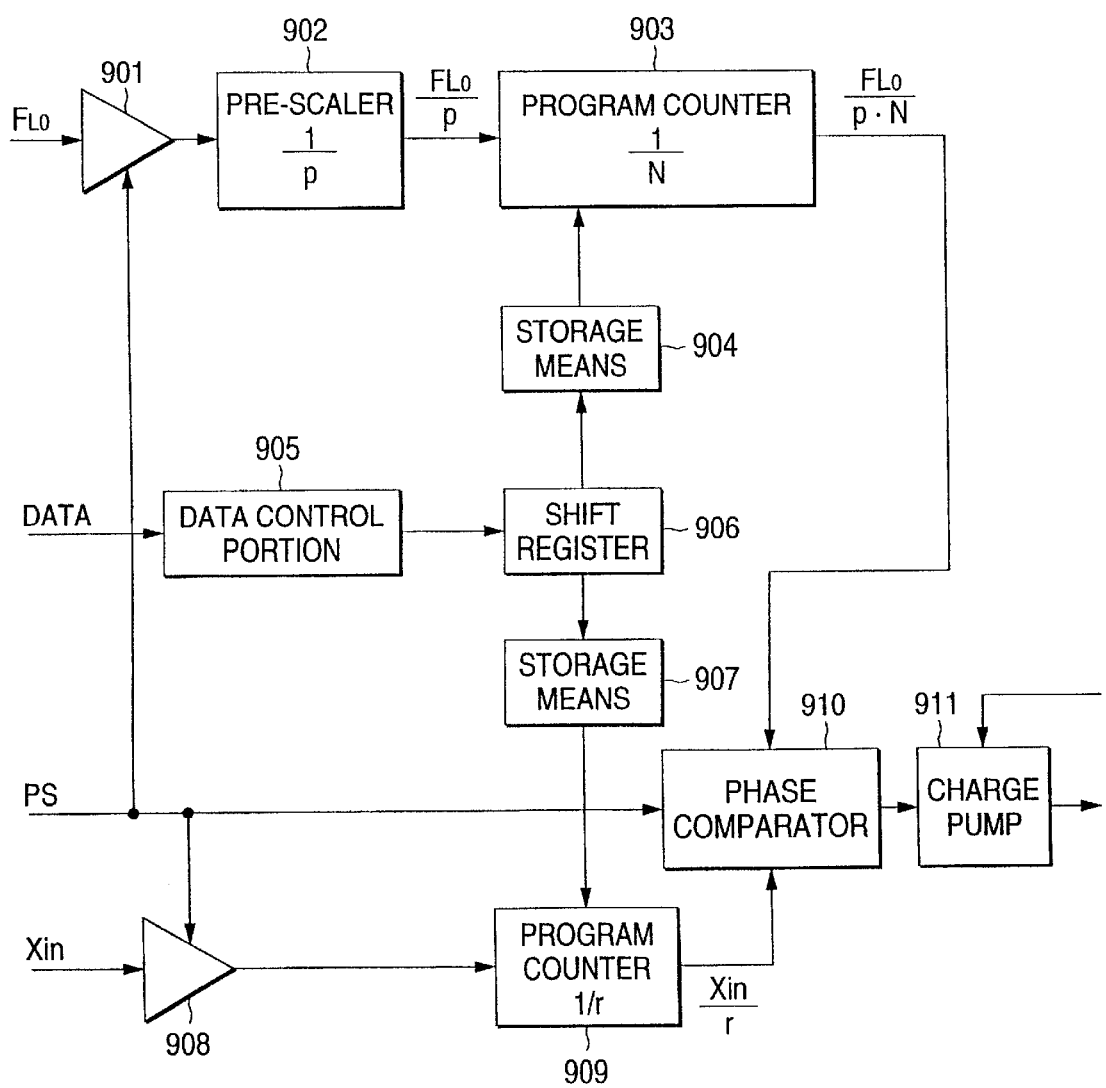
FIG. 9 is a diagram showing an example of a circuit for use in a phase synchronizing means constituting the conventional auto frequency control loop.

FIG. 4 is a graph showing the characteristic of the frequency difference-output voltage in the frequency-difference detection means according to the embodiment of the present invention and realized in a case of a direct conversion receiver. FIG. 5 is a graph showing the characteristic of the frequency difference-output voltage in the frequency-difference detection means according to the embodiment of the present invention and realized in a case of a heterodyne receiver. FIG. 6 is a timing chart showing a process for controlling the AFC in accordance with the relationship of the difference between the received frequency and the local oscillation frequency according to the embodiment of the present invention.

Referring to FIG. 1, the radio-wave receiver incorporating the auto frequency control apparatus comprises: an amplifier 101 for amplifying received frequency-shift keying signal Fsig, a mixer 102 for mixing the two input signals so as to produce an output of the difference in the frequency; a local oscillating portion 103 including a voltage control oscillator 104 for varying the frequency with control voltage so as to transmit a signal and a low pass filter 105 for removing high frequency noise from the output signal from a phase synchronizing means 111 which is transmitted to the voltage control oscillator 104; a demodulating portion 106 for detecting and demodulating a modulated signal from a low-frequency signal obtained from the output of the mixer 102; a frequency-difference detection means 107 including frequency detector 108 for detecting the difference between the frequency of the received signal and the local oscillation frequency in accordance with a result of the detection performed by the demodulating portion 106 and a control means 109 for producing an output of AFC control voltage in accordance with the detected difference in the frequency; a reference-signal generating portion 110 comprising a fixed-frequency oscillator; a phase synchronizing means 111 having a structure shown in FIG. 2, incorporating an auto frequency control means for controlling a division ratio for dividing the frequency of the output signal from the local oscillating portion 103 in accordance with the output voltage from the control means 109 and arranged to make coincide the phase of the divided frequency of the output signal from the reference-signal generating portion 110 and that of the divided frequency of the output signal from the local oscillating portion 103 with each other; a division-data setting mean 112 for setting a division ratio for the phase synchronizing means 111; a reset generating portion 113 for generating a signal for instructing the phase synchronizing means 111 to initialize the operation; and a setting means 114 for instructing information of division data to the division-data setting mean 112 and instructing the reset generating portion 113 to generate a reset signal.

The phase synchronizing means 111 shown in FIG. 2 incorporates limit amplifiers 201 and 212 for limiting the amplitudes of the supplied signals; an auto frequency control means 202 having a counter 203 for dividing the supplied signals with an instructed division ratio; a multiplier 204 for multiplying the frequency of the supplied signals with an integer; an updown counter 205 for supplying, to the counter 203, information of the set division ratio; a register 206 for supplying, to the updown counter 205, an initial value of the division ratio; a correction instruction portion 208 for increasing/decreasing the value counted by the updown counter 205 with an integer value; and a control-signal processing portion 207 for issuing an instruction to the correction instruction portion 208 to increase/decrease the count value and transmitting a reset signal to the counter 203; dividers 209 and 213 for dividing the supplied signals with predetermined division ratios; a shift register 211 in which data which must be supplied to the dividers 209 and 213 is stored, a data control portion 210 for controlling transmission of data for transmitting a data signal transmitted from the division-data setting mean 112 to the shift register 211; a phase comparator 214 for subjecting the phases of the two supplied signals to a comparison and transmitting a signal for correcting the difference; and a charge pump 215 for receiving the signal transmitted from the phase comparator 214 so as to transmit control voltage to the local oscillating portion 103 shown in FIG. 1.

The radio-wave receiver having the auto frequency control apparatus having the above-mentioned structure is arranged to perform the operation for mixing the received frequency-shift keying signal with the output signal from the local oscillation portion. In the direct conversion receiving method, the I signal and the Q signal are directly detected. In the heterodyne receiving method, the signal extracted as the intermediate frequency is detected. Since the above-mentioned operations are the same as those of the conventional examples, the same operations are omitted from description and the operation following the above-mentioned operations will now be described.

The operation of the frequency-difference detection means 107 which is performed in each of the two receiving methods will now be described.

In a case of the direct conversion receiving method, the I and Q signals are used to detect the difference between the frequency of the output signal from the local oscillating portion 103 and the frequency of the received carrier-wave signal. A control voltage for correcting the detected difference is transmitted.

A specific structure of the above-mentioned means will now be described. The demodulating portion 106 is arranged to operate to make the phase shift to be the same when the frequency of the local oscillation portion and that of the received signal are the same. When the frequencies are deviated from each other, the demodulating portion 106 is operated in such a manner that the phase shift is made to be different from each other. Note that the phase can be detected when the frequency detector 108 is provided with a gate circuit of the exclusive OR. The structure is not limited to this. The control means 109 is an output stage of the frequency-difference detection means 107 which produces an output of an AFC control voltage corresponding to information of the frequency difference supplied from the frequency detector 108.

FIG. 4 shows the characteristic of the output voltage from the control means 109 which corresponds to the frequency difference supplied from the frequency detector 108. The input/output characteristic is arranged in such a manner that high impedance is realized when the relationship between the received frequency (Fsig) and the local oscillation frequency (FLo) satisfies Fsig>FLo, low impedance is realized when Fsig<FLo is satisfied and high impedance is realized when Fsig=FLo is satisfied.

In a case of the heterodyne receiving method, the difference between the central frequency of the spectrum of the modulate signal detected from the intermediate frequency and a predetermined reference intermediate frequency is detected. To correct the difference, control voltage is transmitted.

A specific structure of the above-mentioned means will now be described. A function for frequency-voltage conversion (hereinafter called "F-V conversion") with which voltage in proportion to change in the frequency is transmitted is provided for the demodulating portion 106. Moreover, the change in the voltage is averaged in a predetermined period of time so as to obtain the central frequency of the spectrum of the received signal as the voltage. Then, the difference from the reference voltage corresponding to the reference intermediate frequency is detected by the frequency detector 108. Note that the F-V conversion can be performed when the difference peak detection circuit is provided. The structure is not limited to this.

FIG. 5 shows the characteristic of the output voltage from the control means 109 which corresponds to the difference in the frequency detected by the frequency detector 108. The input/output characteristic is arranged in such a manner that high impedance is realized when the relationship among the received frequency (Fsig), local oscillation frequency (FLo) and the reference intermediate frequency (Fif) satisfies Fsig>FLo+Fif, low impedance is realized when Fsig<FLo+Fif is satisfied and high impedance is realized when Fsig=FLo+Fif is satisfied.

The phase synchronizing means 111 detects the phase difference between a signal obtained by dividing the frequency of the output signal from the reference-signal generating portion 110 with a predetermined division ratio and a signal obtained by dividing the frequency of the output signal from the local oscillating portion 103 with a predetermined division ratio. Moreover, the phase synchronizing means 111 transmits control voltage for correcting the phase difference in a direction in which the phase difference is canceled. Since the foregoing means 111 is able to set the division ratio from outside, a characteristic is realized in that a receivable frequency can easily be changed by only changing the division ratio when a plurality of channels are received.

The local oscillating portion 103 must have significant stability of the frequency. It is preferable that a fixed frequency oscillator is provided for the reference-signal generating portion 110 which serves as a predominant unit in order to meet the above-mentioned requirement. For example, a crystal oscillator is frequently employed.

The division ratio with which the phase synchronizing means 111 divides the supplied signal is set when setting data is transmitted from the division-data setting mean 112. The division-data setting mean 112 converts information of division ratio data supplied from outside into the receipt method adapted to the phase synchronizing means 111. Then, the division-data setting mean 112 transmits the converted data.

The phase synchronizing means 111 is provided with the auto frequency control means 202 which is an essential portion of the present invention and structured as shown in FIG. 2. The phase synchronizing means 111 detects the AFC control voltage which is the output of the frequency-difference detection means 107 so as to change the division ratio of the frequency of the output signal from the local oscillating portion 103 to correspond to the AFC control voltage so that the frequency is varied.

The operation which is performed by the auto frequency control means 202 is started in response to an output signal from the reset generating portion 113. Thus, the operation of the control-signal processing portion 207 is reset and the preset value of the updown counter 205 is initialized. Moreover, the setting means 114 is provided which sets data in the division-data setting mean 112 and issues an instruction to the reset generating portion 113 to transmit a signal. The setting means 114 may have dip switches to set data or a switch for instructing generation of a reset signal. As an alternative to this, a memory may be mounted from which data is read so as to set data or an automatic method may be employed by using software control such that a certain electric change is detected so as to instruct generation of the reset signal. Although the structure shown in FIG. 1 is arranged such that the unified setting means 114 is employed to enable both of an instruction of setting the division data and the instruction of the reset signal to be issued in the initial stage immediately after power supply has been performed, the functions may be divided, that is, a poly to my structure may be employed.

Data transmitted from the division-data setting mean 112 is supplied to the data control portion 210 structured as show in FIG. 2. Since data of the division ratio which must be set includes three systems, the data control portion 210 sequentially transmits data of the division ratio to the corresponding systems. The shift register 211 temporarily stores data of the division ratio, and then transmits data to storage means of the three systems to correspond to the length of data. The storage means includes the register 206 disposed in the auto frequency control means 202, a storage means provided for the divider 209 and a storage means provided for the divider 213. Each storage means has a function of temporarily storing data of the division ratio.

Each of the divider 209 and the divider 213 has a program counter so as to have a function of dividing the frequency of the supplied signals with the division ratio corresponding to information of the division ratio stored in the foregoing storage means. Programmable counters capable of varying the division ratio may be employed. As an alternative to this, a fixed counter which does not change the frequency may be employed.

The amplitude of the reference signal is limited by the limit amplifier 212, and then supplied to the divider 213. The frequency of the supplied signal is divided with the division ratio determined by the program counter which has read division data stored in the storage means disposed in the divider 213. The divided frequency is transmitted to the phase comparator 214.

On the other hand, the amplitude of the signal which must be subjected to a comparison is limited by the limit amplifier 201, and then division is controlled by the auto frequency control means 202, after which the signal is supplied to the divider 209. In this embodiment, the frequency of the supplied signal is divided with the division ratio determined by the program counter which has read division data stored in the storage means disposed in the divider 209. The divided frequency is transmitted to the phase comparator 214.

The phase comparator 214 subjects, to a comparison, the phase of the reference signal which is the output of the divider 213 and that of the signal which must be subjected to a comparison. Then, the phase comparator 214 transmits, to the charge pump 215, a difference signal for making coincide the phases with each other. The charge pump 215 produces an output of the control voltage corresponding to the difference signal so as to transmit the control voltage as information for controlling the frequency of the local oscillating portion 103.

OPERATION OF AUTO FREQUENCY CONTROL MEANS

A specific example of the structure of the auto frequency control means 202 which is an essential portion of the present invention and arranged to actually perform the AFC control will now be described with reference to FIG. 2.

An output signal from the limit amplifier 201 is supplied to the counter 203. In accordance with the value set to the updown counter 205, the supplied signal is divided. The division ratio set to the counter 203 is determined in accordance with binary preset input from the updown counter 205. The updown counter 205 is initially supplied with an initial value from the register 206, the initial value being transmitted to the counter 203.

When an instruction to perform the AFC control is supplied from the control-signal processing portion 207, an operation is instructed from the correction instruction portion 208 so as to increase/decrease the present value in the updown counter 205 by a quantity corresponding to the instructed integer. In accordance with the changed present value, the division ratio in the counter 203 is varied.

The control-signal processing portion 207 as well communicates a fact that instruction to vary the division ratio has been issued to the counter 203 and the updown counter 205 so that timing is adjusted. As for the initial value, assuming that the output signal from the limit amplifier 201 is FLo and the initial value is N, the frequency of the output signal from the counter 203 is FLo/N. The output signal from the counter 203 is transmitted to the multiplier 204 so that the input signal is multiplied with a positive integer. Assuming that the multiple of the multiplier 204 is m, the frequency of the output signal from the multiplier 204 is m·FLo/N. The output signal from the multiplier 204 is transmitted to the divider 209 so as to be divided as described above. Assuming that the division ratio is p, the output of the divider 209 is m·FLo/(p·N). A signal representing the frequency is transmitted to the phase comparator 214.

If correction value n is added or subtracted to and from the initial division value N in the counter 203, general formula is expressed as m·FLo/(p·(N±n)).

That is, varying of the count value corresponding to the set division ratio in the counter 203 is controlled in step units so that the frequency of the order of several ppm (parts-per-million) is varied. A condition N>p must always be satisfied and the division ratio N per a division ratio of 1 must be set as precise as possible. The foregoing factor is determined by the multiplier 204. The above-mentioned general formula m·FLo/(p·(N±n)) is deformed into FLo/{(p·(N±n)/m}. Thus, an advantage can be realized in that the division ratio can be defined by a degree corresponding to the multiple m.

Since the phase comparison frequency is not required to be lowered in the phase comparison step because of the multiplier 204, effects can be obtained in that superimposition of noise on the output signal from the voltage control oscillator 104 can be prevented and elongation of time required for the frequency to be stabilized can be prevented.

The phase comparator 214 initially synchronizes the signal which must be subjected to a comparison with the reference signal. After the signal which must be subjected to a comparison has been AFC-controlled, a deviation of several ppm from the original frequency takes place. Therefore, a phase synchronizing operation is performed in such a manner that the reference signal portion is caused to follow the deviation when the modulated signal subjected to the AFC control is supplied to the phase comparator after the synchronization has been established. To maintain the above-mentioned state of synchronization, the charge pump transmits the control voltage so as to control the frequency of the output signal from the local oscillation portion. As a result of the above-mentioned sequential operations, the AFC control can be performed.

Operation of Control-Signal Processing Portion

The operation of the control-signal processing portion 207 for performing the above-mentioned AFC control will now be described with reference to FIGS. 3, 4, 5 and 6. To perform the AFC operation, the control-signal processing portion 207 performs a conversion process using a PS signal (a timing clock) and the output signal (AFC Reset) from the reset generating portion 113 so as to instruct control of each block in the auto frequency control means 202 on the basis of the output voltage (AFC cont) from the frequency-difference detection means 107.

FIG. 3 is a flow chart of the operation and process which are performed by the control-signal processing portion 207. When AFC Reset has been exerted, the control-signal processing portion 207 instructs the updown counter 205 and the counter 203 to reset the counts. Then, the voltage of the AFC cont is, at branch (0) shown in FIG. 3, detected at the leading edge of the timing clock. In this case, the PS signal is employed as the timing clock. The PS signal is a logical signal arranged to rise when the synchronization establishing pattern of the format of the received digital signal is formed so as to reduce the consumption of electric current in the receiving circuit. In the above-mentioned structure, the PS signal is directly employed as the timing clock. If the PS signal frequently rises, the AFC control cannot accurately be performed. Therefore, the control can be performed such that the timing clock is caused to rise after the PS signal has been counted several times. The timing clock is not limited to the foregoing signal and an arbitrary clock may be employed.

Then, determination is performed whether or not the logic is the logic of the AFC cont first recognized after the resetting has been performed at the branch (1). If the logic is the first logic, the value n in the correction instruction portion 208 is set to a default value 0. Then, a flag indicating a fact that the first recognition has been completed is turned on. In response to the AFC cont signal recognized after the second or the following recognition, a routine for determining the value n in the correction instruction portion 208 for varying the division ratio is started. The foregoing operation is performed after the branch (2). The following operation will now be described also with reference to FIG. 6.

A logical state waveform 601 indicates a state in which the received frequency is higher than a required frequency which must be received, and the frequency exceeds a controllable range. Since the recognition of the AFC cont of the second timing clock is high as shown in FIGS. 4 and 5, the operation proceeds to pass through the branch (2), branch (3), branch (4) and branch (6). Subtraction is continued until the value of n is made to be a minimum value which can be set. Also the above-mentioned routine is continued after the third and following clocks. When the value of n has been made to be a minimum value, the AFC operation is continued from the branch (6) in a state in which the present value of n is maintained.

A logical state waveform 602 indicates a state in which the received frequency is higher than a required frequency which must be received and the frequency can be included in the controllable range. Since the recognition of AFC cont at the second timing clock is high as can be understood from FIGS. 4 and 5, the operation proceeds to pass through the branch (2), branch (3), branch (4) and the branch (6) so that the value n is subtracted. An assumption is made that the frequency of FLo has been corrected excessively because of the change in the division ratio in the counter and thus AFC cont has been made to be L. Thus, L is recognized at the fourth timing clock, and the addition to the value n is performed at the branch (4) so that the level is again made to be H. Thus, the portion in the vicinity of the foregoing is an adequate value for the correction.

To maintain the above-mentioned state, the branch (5) is provided so that an operation is performed in such a manner that a state is maintained if an adequate value is detected. Thus, an effect can be obtained in that delay of the operation occurring because of the change in the division value is prevented. If a re-correction must be performed depending on the degree of deviation between the received frequency and the local oscillation frequency occurring because of lapse of long time, the re-correction can be performed by resuming the AFC control operation in response to the AFC reset signal. In this case, a method may be employed in which an external means for decoding the demodulation data detects increase in a bit error rate so as to instruct the setting means 114 to transmit AFC reset. Another method may be employed in which the setting means 114 instructs to transmit the AFC reset at every predetermined time. The method is not limited to the foregoing methods.

A logical state waveform 603 indicates a state in which the received frequency initially and substantially coincides with required frequency which must be received. If the AFC cont is brought to a high impedance state which does not require correction at the first timing clock, also the second clock is in the high impedance state. Therefore, the process is restarted at the branch (2). If slight deviation takes place after time has elapsed, the branch (2) recognizes the necessity of performing the process. If a fact that the logic of AFC cont is high is recognized, the value of n is subtracted. Thus, the correction operation is performed similarly to the case of the logical state waveform 602.

If the AFC cont is again made to be the high impedance, the above-mentioned operation is repeated.

If the received frequency is lower than the required frequency which must be received, the correction operation similar to the above-mentioned operation is performed except for the logic of the AFC cont which is recognized at the first clock after the resetting has been performed is inverted.

The above-mentioned correction process is instructed to each block in the auto frequency control means 202 with the AFC control voltage transmitted from the frequency-difference detection means 107. Thus, the frequency which is the signal which must be subjected to a comparison in the phase comparator 214 is varied. Thus, the frequency of the output signal from the local oscillating portion 103 is changed by a quantity corresponding to the corrected deviation in the frequency. As a result, the frequency (Fsig) of the received signal can be made substantially coincide with the required frequency which must be received. As a result, the auto frequency control can be performed.

As described above, the present invention has the structure that the control voltage, which is transmitted from the control means in response to the signal corresponding to the frequency difference between the carrier-wave signal for the received frequency-shift keying signal obtainable from the frequency detector and the output signal from the local oscillation portion, is transmitted to the auto frequency control means disposed in the phase synchronizing means. Thus, the frequency of the output signal from the voltage control oscillator disposed in the local oscillation portion can be changed in a state in which the frequency of the output signal from the reference-signal generating portion is fixed. Therefore, the frequency of the output signal from the local oscillation portion is varied regardless of the characteristic of the device in the circuit constituting the oscillator in the reference-signal generating operation and deterioration in the stability of the frequency so that the auto frequency control apparatus is realized with a simple structure.

What is claimed is:

1. An auto frequency control apparatus comprising:

an amplifier for amplifying a frequency-shift keying signal;

a local oscillation portion for transmitting a signal for converting the frequency-shift keying signal into a low-frequency signal;

a mixer for mixing an output signal from said amplifier and an output signal from said local oscillation portion with each other;

a demodulating portion for extracting a low-frequency signal from the output signal, the frequency of which has been converted by said mixer, so as to detect and demodulate the modulated signal;

phase synchronizing means which makes coincide a frequency obtained by dividing the output signal from said local oscillation portion and a frequency obtained by dividing a reference signal with each other by detecting the phase difference between the two signals and which transmits a control voltage corresponding a result of the detection to said local oscillation portion so as to synchronize the phases;

a reference-signal generating portion for generating the reference signal which is supplied to said phase synchronizing means;

frequency-difference detection means connected to said phase synchronizing means, said frequency-difference detection means communicating a voltage corresponding to a result of the detection of the frequency difference between a carrier-wave signal for the frequency-shift keying signal and the output signal from said local oscillation portion in accordance with a result of the detection performed by said demodulating portion; and division-data setting means for setting a division ratio for dividing the frequency of a signal which is supplied to said phase synchronizing means wherein said frequency-difference detection means is structured to always generate an output voltage signal for maintaining a state in which a central frequency of the spectrum of a received signal and the frequency of the output signal from said local oscillation portion coincide with each other when a direct conversation receiving method is employed.

2. An auto frequency control apparatus comprising;

an amplifier for amplifying a frequency-shift keying signal;

a local oscillation portion for transmitting a signal for converting the frequency-shift keying signal into a low-frequency signal;

a mixer for mixing an output signal from said amplifier and an output signal from said local oscillation portion with each other;

a demodulating portion for extracting a low-frequency signal from the output signal, the frequency of which has been converted by said mixer, so as to detect and demodulate the modulated signal;

phase synchronizing means which makes coincide a frequency obtained by dividing the output signal from said local oscillation portion and a frequency obtained by dividing a reference signal with each other by detecting the phase difference between the two signals and which transmits a control voltage corresponding a result of the detection to said local oscillation portion so as to synchronize the phases;

a reference-signal generating portion for generating the reference signal which is supplied to said phase synchronizing means;

frequency-difference detection means connected to said phase synchronizing means, said frequency-difference detection means communicating a voltage corresponding to a result of the detection of the frequency difference between a carrier-wave signal for the frequency-shift keying signal and the output signal from said local oscillation portion in accordance with a result of the detection performed by said demodulating portion; and division-data setting means for setting a division ratio for dividing the frequency of a signal which is supplied to said phase synchronizing means wherein said frequency-difference detection means includes:

a frequency detector for detecting a component of the frequency difference between the carrier-wave signal for the frequency-shift keying signal and the output signal from said local oscillation portion in accordance with a result of the detection performed by said demodulating portion; and control means for producing an output of a logical voltage in accordance with the amount of deviation of the frequency difference obtained from said frequency detector from a predetermined referential frequency difference.

3. An auto frequency control apparatus according to claim 2, wherein said control means produces an output of a logical voltage signal corresponding to the output signal from said frequency detector.

4. An auto frequency control apparatus comprising:

an amplifier for amplifying a frequency-shift keying signal;

a local oscillation portion for transmitting a signal for converting the frequency-shift keying signal into a low-frequency signal;

a mixer for mixing an output signal from said amplifier and an output signal from said local oscillation portion with each other;

a demodulating portion for extracting a low-frequency signal from the output signal, the frequency of which has been converted by said mixer, so as to detect and demodulate the modulated signal;

phase synchronizing means which makes coincide a frequency obtained by dividing the output signal from said local oscillation portion and a frequency obtained by dividing a reference signal with each other by detecting the phase difference between the two signals and which transmits a control voltage corresponding a result of the detection to said local oscillation portion so as to synchronize the phases;

a reference-signal generating portion for generating the reference signal which is supplied to said phase synchronizing means;

frequency-difference detection means connected to said phase synchronizing means, said frequency-difference detection means communicating a voltage corresponding to a result of the detection of the frequency difference between a carrier-wave signal for the frequency-shift keying signal and the output signal from said local oscillation portion in accordance with a result of the detection performed by said demodulating portion; and division-data setting means for setting a division ratio for dividing the frequency of a signal which is supplied to said phase synchronizing means wherein said division-data setting means sets division ratios for dividing the frequencies of the output signal from said local oscillation portion which is supplied to said phase synchronizing means and the output signal from said reference-signal generating portion.

5. An auto frequency control apparatus comprising:

an amplifier for amplifying a frequency-shift keying signal;

a local oscillation portion for transmitting a signal for converting the frequency-shift keying signal into a low-frequency signal;

a mixer for mixing an output signal from said amplifier and an output signal from said local oscillation portion with each other;

a demodulating portion for extracting a low-frequency signal from the output signal, the frequency of which has been converted by said mixer, so as to detect and demodulate the modulated signal;

phase synchronizing means which makes coincide a frequency obtained by dividing the output signal from said local oscillation portion and a frequency obtained by dividing a reference signal with each other by detecting the phase difference between the two signals and which transmits a control voltage corresponding a result of the detection to said local oscillation portion so as to synchronize the phases;

a reference-signal generating portion for generating the reference signal which is supplied to said phase synchronizing means;

frequency-difference detection means connected to said phase synchronizing means, said frequency-difference detection means communicating a voltage corresponding to a result of the detection of the frequency difference between a carrier-wave signal for the frequency-shift keying signal and the output signal from said local oscillation portion in accordance with a result of the detection performed by said demodulating portion; and division-data setting means for setting a division ratio for dividing the frequency of a signal which is supplied to said phase synchronizing means wherein said phase synchronizing means includes:

auto frequency control means which controls the division ratio of the output signal from said local oscillation portion in accordance with the logical output voltage generated by said frequency-difference detection means so as to automatically vary the frequency;

a first divider for lowering the frequency of the output signal from said auto frequency control means at a set division ratio;

a second divider for lowering the frequency of the output signal from said reference-signal generating portion at a set division ratio;

a phase comparator for detecting the phase difference between the output signal from said first divider and the output signal from said second divider; and a charge pump which receives pulse waves or time corresponding to the phase difference transmitted from said phase comparator into a DC voltage for controlling the frequency of said local oscillation portion.

6. An auto frequency control apparatus according to claim 5, wherein said first and second dividers have storage means for temporarily storing division data transmitted from said division-data setting means and a program counter for performing a dividing operation in accordance with stored division data.

7. An auto frequency control apparatus according to claim 5, wherein said auto frequency control means includes;

a counter for dividing the frequency of the output signal from said local oscillation portion with a division ratio instructed with counter preset input;

a multiplier for multiplying the frequency of the output signal from said counter with an integer;

an up-down counter for transmitting a preset value which serves as data for setting the division ratio to said counter;

a register for giving an initial value to said up-down counter;

a correction instruction portion for increasing/decreasing the set value for said up-down counter with an integer value and a control-signal processing portion for issuing an increasing/decreasing instruction to said correction instruction portion and transmitting a reset signal to said counter.

8. An auto frequency control apparatus according to claim 7, wherein said control-signal processing portion has functions of detecting the output voltage of said frequency-difference detection means at the first transition of a timing clock, issuing, to said correction instruction portion, an instruction to increase/decrease the integer value in accordance with the logic at the detection and resetting the count by communicating a fact that the correction has been performed to said counter.

9. An auto frequency control apparatus comprising:

an amplifier for amplifying a frequency-shift keying signal;

a local oscillation portion for transmitting a signal for converting the frequency-shift keying signal into a low-frequency signal;

a mixer for mixing an output signal from said amplifier and an output signal from said local oscillation portion with each other;

a demodulating portion for extracting a low-frequency signal from the output signal, the frequency of which has been converted by said mixer, so as to detect and demodulate the modulated signal;

phase synchronizing means which makes coincide a frequency obtained by dividing the output signal from said local oscillation portion and a frequency obtained by dividing a reference signal with each other by detecting the phase difference between the two signals and which transmits a control voltage corresponding a result of the detection to said local oscillation portion so as to synchronize the phases;

a reference-signal generating portion for generating the reference signal which is supplied to said phase synchronizing means;

frequency-difference detection means connected to said phase synchronizing means, said frequency-difference detection means communicating a voltage corresponding to a result of the detection of the frequency difference between a carrier-wave signal for the frequency-shift keying signal and the output signal from said local oscillation portion in accordance with a result of the detection performed by said demodulating portion; and division-data setting means for setting a division ratio for dividing the frequency of a signal which is supplied to said phase synchronizing means wherein a reset generating portion is provided as a subsidiary unit for said phase synchronizing means and an instruction is issued to said auto frequency control means to initialize the control operation.

10. An auto frequency control apparatus according to claim 9, wherein said reset generating portion transmits logical signals for resetting the set division ratio value and the counter to default values.

11. An auto frequency control apparatus comprising:

an amplifier for amplifying a frequency-shift keying signal;

a local oscillation portion for transmitting a signal for converting the frequency-shift keying signal into a low-frequency signal;

a mixer for mixing an output signal from said amplifier and an output signal from said local oscillation portion with each other;

a demodulating portion for extracting a low-frequency signal from the output signal, the frequency of which has been converted by said mixer, so as to detect and demodulate the modulated signal;

phase synchronizing means which makes coincide a frequency obtained by dividing the output signal from said local oscillation portion and a frequency obtained by dividing a reference signal with each other by detecting the phase difference between the two signals and which transmits a control voltage corresponding a result of the detection to said local oscillation portion so as to synchronize the phases;

a reference-signal generating portion for generating the reference signal which is supplied to said phase synchronizing means;

frequency-difference detection means connected to said phase synchronizing means, said frequency-difference detection means communicating a voltage corresponding to a result of the detection of the frequency difference between a carrier-wave signal for the frequency-shift keying signal and the output signal from said local oscillation portion in accordance with a result of the detection performed by said demodulating portion; and division-data setting means for setting a division ratio for dividing the frequency of a signal which is supplied to said phase synchronizing means wherein said local oscillation portion includes:

a voltage control oscillator, the oscillation frequency of which is changed to correspond to external control voltage; and a low pass filter arranged to cut a noise component of the control voltage which is the output of said phase synchronizing means and act on a transient response characteristic in a phase synchronizing process.

12. An auto frequency control apparatus according to any one of claims 2 to 11, wherein said frequency-difference detection means is structured to always generate an output voltage signal for maintaining a state in which the difference between a central frequency of the spectrum of a received signal and the frequency of the output signal from said local oscillation portion coincides with a predetermined intermediate frequency when a heterodyne receiving method is employed.

13. An auto frequency control apparatus according to any one of claims 2 to 11, wherein said frequency-difference detection means is structured to always generate an output voltage signal for maintaining a state in which a central frequency of the spectrum of a received signal and the frequency of the output signal from said local oscillation portion coincide with each other when a direct conversion receiving method is employed.

14. A radio-wave receiver comprising an auto frequency control apparatus claimed in claim 12 and adapted to the heterodyne receiving method.

15. A radio-wave receiver comprising an auto frequency control apparatus claimed in claim 13 and adapted to the direct conversion receiving method.

16. An auto frequency control apparatus comprising:

an amplifier for amplifying a frequency-shift keying signal;

a local oscillation portion for transmitting a signal for converting the frequency-shift keying signal into a low-frequency signal;

a mixer for mixing an output signal from said amplifier and an output signal from said local oscillation portion with each other;

a demodulating portion for extracting a low-frequency signal from the output signal, the frequency of which has been converted by said mixer, so as to detect and demodulate the modulated signal;

phase synchronizing means which makes coincide a frequency obtained by dividing the output signal from said local oscillation portion and a frequency obtained by dividing a reference signal with each other by detecting the phase difference between the two signals and which transmits a control voltage corresponding a result of the detection to said local oscillation portion so as to synchronize the phases;

a reference-signal generating portion for generating the reference signal which is supplied to said phase synchronizing means;

frequency-difference detection means connected to said phase synchronizing means, said frequency-difference detection means communicating a voltage corresponding to a result of the detection of the frequency difference between a carrier-wave signal for the frequency-shift keying signal and the output signal from said local oscillation portion in accordance with a result of the detection performed by said demodulating portion; and division-data setting means for setting a division ratio for dividing the frequency of a signal which is supplied to said phase synchronizing means wherein said frequency-difference detection means is structured to always generate an output voltage signal for maintaining a state in which the difference between a central frequency of the spectrum of a received signal and the frequency of the output signal from said local oscillation portion coincides with a predetermined intermediate frequency when a heterodyne receiving method is employed.

* * * * *